Figure 1:
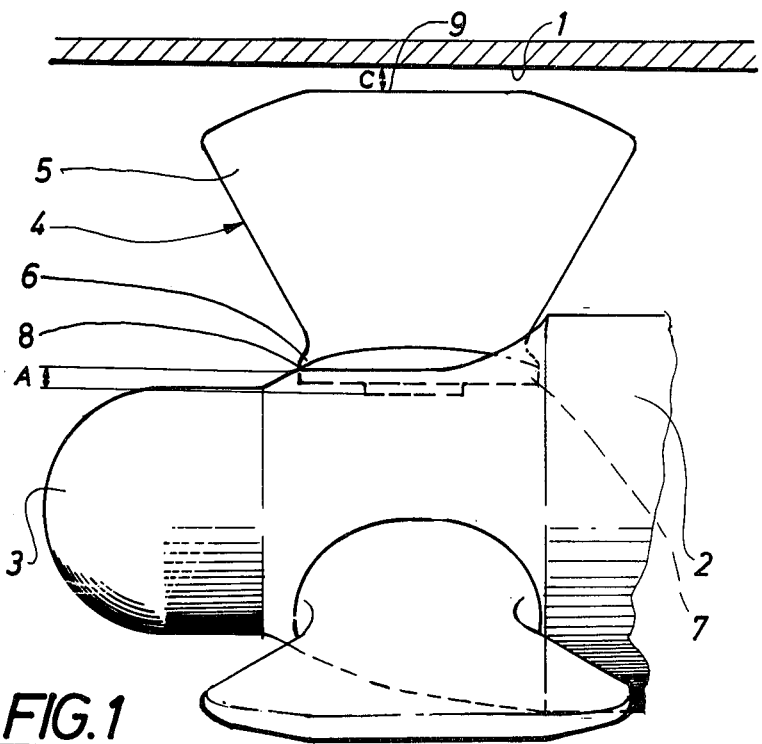

United States Patent [19]

Karlsson

[11] 4,150,914
[45] Apr. 24, 1979

[54] PROPELLER BLADES

[75] Inventor: Stig O. Karlsson, Kristinehamn, Sweden

[73] Assignee: AB Karlstads Mekaniska Werkstad, Karlstad, Sweden

[21] Appl. No.: 826,753

[22] Filed: Aug. 22, 1977

[30] Foreign Application Priority Data

Dec. 20, 1976 [SE] Sweden ............................ 7614288

[51] Int. Cl.² ............................................. F01D 5/20
[52] U.S. Cl. .............................. 415/129; 415/213 C; 416/228
[58] Field of Search ................. 415/129, 201, DIG. 3, 415/213 C, 215, 173 R, 173 A; 416/207, 228, 146 R

[56] References Cited

U.S. PATENT DOCUMENTS

| | | | |
|---|---|---|---|
| 2,300,721 | 11/1942 | Young | 415/129 |
| 2,351,645 | 6/1944 | Troller | 415/129 |
| 2,847,941 | 8/1958 | Jackson | 415/213 C |
| 3,176,960 | 4/1965 | Sproule | 415/129 |
| 3,386,155 | 6/1968 | Jenkinson | 415/DIG. 3 |
| 3,428,244 | 2/1969 | Palmer | 415/213 C |
| 3,447,783 | 6/1969 | Wijkander | 415/129 |
| 4,022,543 | 5/1977 | Göransson | 416/207 X |
| 4,068,979 | 1/1978 | Vysokorodov | 416/207 |

FOREIGN PATENT DOCUMENTS

| | | | |
|---|---|---|---|
| 115470 | 12/1929 | Austria | 415/228 |
| 368160 | 3/1932 | United Kingdom | 415/DIG. 3 |

*Primary Examiner*—Everette A. Powell, Jr.

[57] ABSTRACT

The present invention relates to propeller blades which are mounted in a rotatable propeller hub and pivotable in the same by means of inner shafts with axes substantially radial to the axis of rotation of the hub and countersunk in said hub and located inside an outer peripheral edge of the same. The propeller hub is positioned in an shroud means, a tunnel or similar with a surrounding wall, which is substantially circular and concentric to the axis of rotation of the hub. The propeller blade has a blade vane with an outer edge with portions shaped as peripheral arcs concentric to the hub axis and having a play to the surrounding wall which is smaller than the necessary radial movement which is required for the lifting of said shaft over the peripheral edge of the hub when the propeller blade has to be demounted from the hub. According to the invention the peripheral arcs of the outer edge are limited to the front and rear portion of the edge while the centric portion extends inside the circle forming said arc shaped portions so that a play is formed between this centric portion and the wall of the shroud means when the blade is pivoted to a position in which the same is substantially parallel to the axis of the shroud. This play allows the blade to be moved in radial direction so that the shaft can pass said peripheral edge of the hub. With this arrangement a demounting and mounting of the propeller blade in axial direction is possible without removing the hub from the shroud means and without the negative influence on the propeller efficiency from an enlarged all over play between the outer edge of the blade and the wall of the shroud means.

3 Claims, 3 Drawing Figures

IMPROVEMENT IN PROPELLER BLADES

The present invention relates to a propeller blade in a rotatable propeller hub and pivotable in the same by means of inner shaft means having an axis substantially radial to the axis of rotation of the hub and countersunk in said hub and located inside an outer peripherial edge of the same. The propeller hub in operating position is positioned in a shrouding means having a substantially circular wall which is substantially concentric relative to the axis of rotation of the hub. The propeller blade has a blade vane with a front and rear edge extending substantially in radial direction from said axis of rotation and an outer edge with portions having the shape of a peripherical arc departing from a centric axis and extending in the space between the front and the rear edge, which portions in mounted condition and a pivoting position of the blade intended for operation have a play to said wall which is smaller than the distance between the innermost surface of the inner shaft means and said peripherical edge of the hub in the mounted position of the blade.

There are several types of propellers, which are arranged in shrouded mounting or in a tunnel. The latter type of mounting is used in connection with propellers for steering purposes which are mounted in a tunnel extending crosswise in the stem of a ship. There are also types of driving propellers in a shrouded mounting. Quite often propellers of this type are provided with a pivoting mechanism for adjustable setting of the propeller blades, which can be required to be demounted for repair and maintenance. Because of reasons connected with the design the blades are generally provided with a shaft means that must be removed in diametrical direction out of the propeller hub, before the blade can be removed from the same.

The present invention relates to propeller blades of this type.

In order to obtain as high a degree of efficiency as possible, the tunnel of the shrouding means enclose the propeller blades with a play, which is so small that is does not permit said radial displacement of the blade for the demounting operation. In order to avoid the very time consuming and tedious work to remove the whole propeller out of the tunnel or the shrouding means, when the blades have to be demounted, it has been proposed to make an axially extending groove in the surrounding tunnel or shrouding means, which would permit the lifting out of one propeller blade at a time from the hub, if the blade is positioned right in front of the groove and set in alignment to the same. When such a groove is used, the general play between the propeller blades and the tunnel or shrouding device can be kept small and in spite thereof it is not necessary to separate the propeller from the tunnel or the shrouding device, when the blades are to be demounted. However, in practise it is quite difficult to make such a groove, this especially in connection with stem tunnels for steering propellers, and the groove can give rise to turbulences affecting the degree of efficiency in a negative way. To make such a groove in an already built ship also involves great difficulties.

It is an object of the present invention to provide a propeller blade which permits a simple demounting and mounting in a propeller hub located in a tunnel or in a shrouding means while maintaining a high degree of efficiency of the propeller arrangement.

Figure 2:
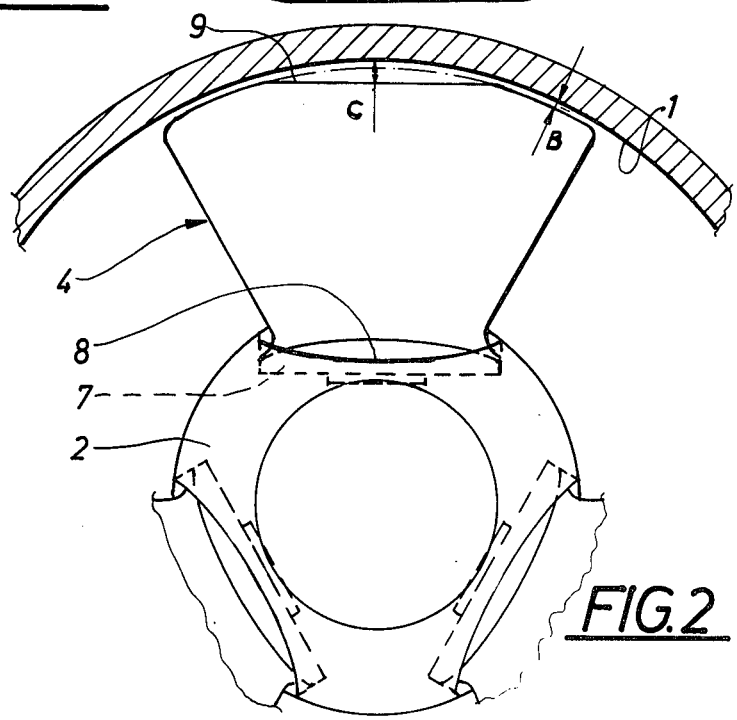

In the following a description of an embodiment of the invention is made, reference being made to the accompanying drawings in which FIG. 1 shows a partial cross sectional view of a tunnel with a propeller;

FIG. 2 shows the propeller in the tunnel in a front view and in

Figure 3:
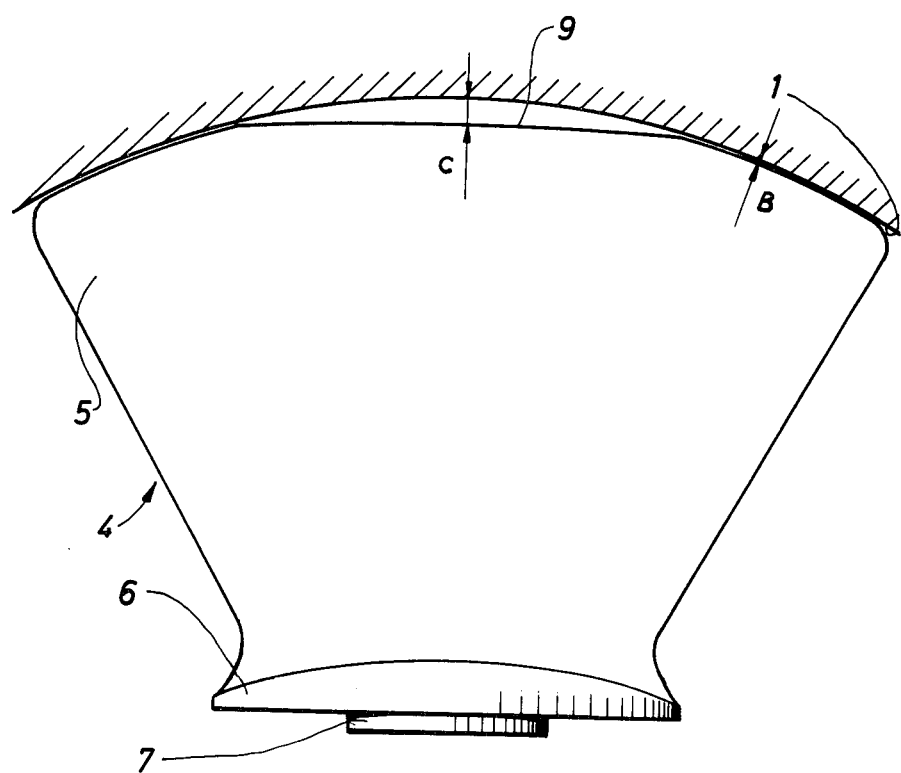

FIG. 3 a portion of the propeller blade designed in accordance with the invention is illustrated on an enlarged scale.

According to FIG. 1 a propeller with a propeller hub 2 is mounted in a tunnel, the cylindrical inner wall of which is indicated with 1, said hub 2 in one direction terminating with a hub point 3, its opposite end being connected to driving means not shown. A number of propeller blades 4 with peripheral portions 5 and flanges 6 are interspaced round the propeller hub 2. At the flanges 6 the blades 4 with a portion 7 forming shaft means are countersunk in the propeller hub 2, and here they are connected with a pivoting mechanism so that they can be pivoted around pivoting axes radial to the hub.

When in operation the blades work at a limited pivoting angle on both sides of a position, which is perpendicular to the pivoting position illustrated in FIG. 1, thus corresponding to an axial plane of the propeller hub 2, see FIG. 2. With this arrangement the blade, in case the tunnel extends in transverse direction can impart to the ship a steering capacity in both directions and also work quite neutrally without any steering action, this being carried out by adjusting the setting of the pivoting angle of the blades. The blades can be disengaged from the pivoting mechanism and can be set in a plane diametrical to the hub 2, as is shown in FIG. 1.

In connection with a demounting operation, which at intervals is necessary, it is highly desirable that there will be no need for the removal of the propeller hub 2 with its driving means from the tunnel. However, the inner portion 7 of the blade must be lifted for a distance A above the edge 8 of the hub in order to permit the blade to be taken out of the tunnel past the end 3 of the propeller hub. As is evident from FIG. 2, such a lifting operation is not possible due to the play, indicated with B in FIG. 2, between the point 5 of the blade and the tunnel wall 1, which is determined to be small due to reasons of efficiency, and considerably smaller than the required lifting height A. This is valid in a working position (FIG. 2) of the blade and also in the aligned position illustrated in FIG. 1, if the outer edge of the portion 5 of the blades is provided with an unchanged radius according to the dashed and dotted line in FIG. 2, which is the case with propellers of the prior art. However, according to the invention the edge of the peripheral portion of the blade is planed off at a central portion along an edge line 9, which in mounted condition of the blade is at least at an equally great distance (the measure C) from the tunnel wall 1 as the distance A between the innermost surface of the portion 7 and the edge 8 of the propeller hub. With this arrangement enough space is allowed for the lifting of the blade so that its inner portion 7 can pass by the edge 8, when the blade is in a completely aligned position, in which it extends along a plane extending in axial direction to the propeller hub 2.

Thus, the outer edge of the peripheral portion of the blade does not at the front edge and rear edge of the blade undergo any change relative to a normal design.

According to the invention the removal of material at the peripheral edge of the blade is limited to a centric portion of the edge line. In practise it has turned out that about one fourth of the edge line near to the front edge and the rear edge can be left without correction. These unaffected portions are thus dimensioned for the play (the measure B) giving the best possible efficiency, i.e. in practice the smallest play which can be used with due consideration to tolerances and irregularities with respect to roundness of the wall 1 and possibly radial wobble of the propeller. It has turned out that by conserving this smallest possible play of the point of the blade near to the front edge and the rear edge the degree of efficiency is only insignificantly affected by the correction the propeller blade according to the invention has undergone in order to make the mounting of the blades possible.

In FIG. 1 the edge line of the blade at the planed off section has the shape of a chord, a design, which is practically possible and which in a simple way explains the underlying principle of the invention. However, the tendency of the blade for creating turbulences can be greater than by a more rounded off shape according to a modified design, illustrated in FIG. 3. In this embodiment the edge line at the front edge and rear edge of the blade still forms peripheral circle arcs with their centre in the axis of rotation of the propeller, which peripheral arcs in conventional manner connect to the front edge and rear edge with a radius at the corners. The peripheral arcs have a length as counted from said edges corresponding to approximately one fourth of the total length of the edge line. The points, where the peripheral arcs terminate, thus one fourth of the edge line from the front and rear edge, are two construction points, which are supplemented with a third construction point, located in the centre line of the blade, and as a pre-requisite also of its turning axis at the necessary distance from the wall in order to permit the demounting to be carried out, this distance thus corresponding to the measure C. The edge line is not designed as a curved line extending through the lateral points and the centre point. With this arrangement the blade is given a more rounded off design that when designing the centre portion as a chord. Within the principle mentioned that the front portions are peripheral arcs and the centre portion a rounded off part, which does not at any point extend outside of said normal to the centre line of the blade, quite a lot of different designs of details can be imagined within the scope of the invention.

When demounting a propeller blade its pivoting mechanism is coupled in such a manner that the blade can be aligned into a position with the blade in the longitudinal direction of the tunnel of the shrouding means (see FIG. 1). After its disengagement from the propeller hub the blade is lifted in a strictly radial direction, so that the innermost part of the inner portion 7 in axial direction can pass over the edge 8, thus with the measure A. As mentioned, the measure C is then adjusted in such a manner that it makes possible this lifting operation without the edge of the blade striking the wall 1 of the tunnel. The lifting operation in a known manner can be carried out by means of a hydraulic device incorporated in the propeller hub. The blade can now be removed from the propeller hub and be taken out of the tunnel, an operation which in connection with small blades can be performed by continued displacement by hand, or, when the blades are heavy, by means of a travelling crane, the rail of which has been introduced into the tunnel. The mounting takes place in the reverse order.

The invention is not limited to the application illustrated and described, but can be applied also in connection with other types of enclosed devices, where a corresponding radial displacement is required within a narrow space, by means of example in connection with Kaplan-type turbines. In the fore-going it has been assumed that the wall of the tunnel is cylindrical. However, if it is conical, spherical or has any other design of circular cross-section, the portion 9 must of course be adapted in such a manner that the play C is obtained along the whole of its longitudinal extension.

I claim:

1. Propeller blade for use in a propeller arrangement comprising a propeller hub rotatably mounted around an axis of rotation, a plurality of propeller blades mounted in said propeller hub, shafts on said blades mounted inside said propeller hub for mounting said blades to be pivotable between a first operative position in which vanes of the blades extend transverse to the axis of rotation and a second mounting and demounting position in which the vanes extend substantially parallel to said axis of rotation, bearings for said shafts in the propeller hub each having a pivoting axis substantially radial to the axis of rotation of the hub and including a space for the accommodation of a shaft located inside the outer peripheral edge of the hub, and a shroud for said blades having a circular wall substantially concentric relative to the axis of rotation of the hub, each blade vane comprising a front and a rear edge extending substantially in a radial direction from said axis of rotation of the hub when the blade is mounted in the hub and an outer edge with portions having the shape of a peripheral arc departing from said axis of rotation of the hub when the blade is mounted in the hub and extending in the space between the front and the rear edge of the vane, said portions of the outer edge of the blade vane in said first operative position of the blade being at a distance from said shroud wall which is smaller than the distance between the innermost surface of its respective shaft and the peripheral edge of the hub, said portions of the outer edge of the blade vane being provided adjacent to the front edge and the rear edge of the blade vane and there is provided a centric portion of the outer edge of the blade vane which extends inside an arc forming a circular connection between said outer edge portions of peripheral arc shape, said centric portion having a play relative to said shroud wall which is at least equal to said distance between the innermost surface of its respective shaft and the peripheral edge of the hub.

2. Propeller blade according to claim 1, wherein said centric portion of the outer edge of the blade vane is located on or inside a chord of said portions of peripheral arc shape, said chord being normal to a radius of the axis of rotation of the hub and substantially half-way between the front and rear edge of the blade vane.

3. Propeller blade having a shaft for mounting in a propeller arrangement comprising a rotatably mounted propeller hub, a bearing in the propeller hub for said shaft for pivoting of the propeller blade about a pivoting axis extending substantially in a radial direction to the hub, said bearing being provided with an outer edge over which the innermost portion of the shaft has to pass when demounting the propeller blade in an axial direction, and a shroud in which said propeller hub is positioned, said shroud having a substantially circular wall substantially concentric relative to the axis of rotation of said hub, said blade comprising a blade vane with a front and a rear edge and an outer edge in the space between the front and the rear edge having a peripheral arc concentric to the axis of rotation of the hub when the blade is mounted in the hub, said outer edge of the blade vane having a play relative to said shroud wall which is smaller than the distance between the innermost portion of its shaft and said edge of said bearing in the mounted position of said blade, said peripheral arc being provided only at portions adjacent to the front and rear edge of the blade vane along substantially a quarter of the length between said front and rear edge, and the remaining centric portion being planar to a line having a play relative to said shroud wall which is at least equal to the distance between the innermost portion of said shaft and said edge of said bearing when the blade vane is pivoted to a position in which it is substantially parallel to the axis of said shroud.

* * * * *